United States Patent
Zhu

(10) Patent No.: US 7,330,713 B2
(45) Date of Patent: Feb. 12, 2008

(54) HANDPORTABLE CELLULAR TELEPHONE ADAPTED TO RECEIVE MESSAGES AND A METHOD FOR PROCESSING MESSAGES

(75) Inventor: Dong Zhu, Værløse (DK)

(73) Assignee: Nokia Corporation, Espoo (FI)

( * ) Notice: Subject to any disclaimer, the term of this patent is extended or adjusted under 35 U.S.C. 154(b) by 160 days.

(21) Appl. No.: 10/655,457

(22) Filed: Sep. 3, 2003

(65) Prior Publication Data

US 2005/0048998 A1    Mar. 3, 2005

(51) Int. Cl.
*H04L 12/58*    (2006.01)
(52) U.S. Cl. .............................. 455/412.1; 455/412.2; 455/418
(58) Field of Classification Search ............. 455/412.1, 455/412.2
See application file for complete search history.

(56) References Cited

U.S. PATENT DOCUMENTS

| 6,751,299 | B1* | 6/2004 | Brown et al. ............ 379/88.18 |
| 6,763,095 | B1* | 7/2004 | Cermak et al. .......... 379/93.23 |
| 6,785,379 | B1* | 8/2004 | Rogers et al. ......... 379/265.02 |
| 2002/0169748 | A1* | 11/2002 | Macholda ....................... 707/1 |
| 2003/0060240 | A1* | 3/2003 | Graham et al. ............. 455/566 |
| 2003/0105804 | A1* | 6/2003 | Turner et al. ............... 709/203 |

OTHER PUBLICATIONS

Internet (www.planet.nl/) article, "Vodafone Stops SMS Spam with White List" (title translated), published Jun. 10, 2003.

* cited by examiner

*Primary Examiner*—William Trost
*Assistant Examiner*—Fred Casca
(74) *Attorney, Agent, or Firm*—Harrington & Smith, PC

(57) ABSTRACT

A method for processing an incoming message in a handportable cellular telephone comprises looking up an identification of a sender of the message in a user-defined white list or black list before making the message available to the user of the telephone. The method thus allows for setting up a user-administrated spam filter for, e.g., SMS messages, e-mails, ringing tone or network setting messages. Access to the user-defined list may be password-protected, so as to prevent a user, such as a child, from amending the list, such amending being exclusively restricted to a person, such as a parent, administrating the phone. If the sender is not found in a user-defined white list, or if the sender is found in a user-defined black list, the message is discarded.

20 Claims, 3 Drawing Sheets

HANDPORTABLE CELLULAR TELEPHONE
ADAPTED TO RECEIVE MESSAGES AND A
METHOD FOR PROCESSING MESSAGES

TECHNICAL FIELD

The present invention relates to the field of handportable cellular telephones, in particular to the field of processing of messages in such telephones.

BACKGROUND OF THE INVENTION

Most state-of-the-art handportable telephones are configured to send and receive short text messages, i.e. so-called SMS (Short Message System) messages. While such short messages are popular for various private purposes, the still increasing prevalence of handportable cellular telephones has led to an increase in dissemination of spam messages. Accordingly, one of Europe's largest network providers has proposed a white listing system, in which approved parties are entered on a white list and senders of spam messages are entered on a black list, so that spam providers are identifiable by the recipients of the messages.

SUMMARY OF THE INVENTION

It is a general object of preferred embodiments of the present invention to provide a system and a method with improved flexibility in the processing of incoming messages in a handportable cellular telephone, including but not limited to SMS messages. More particularly, preferred embodiments of the present invention aim at facilitating the setting-up of spam filters for incoming messages.

Accordingly, the invention provides a handportable cellular telephone adapted to receive incoming messages, and comprising a processor configured to:

store a first user-defined list of potential senders of messages;
identify a sender of an incoming message upon receipt of the message;
look up the sender in the first list, and:
if the sender appears in the first list: process the message according to a first predetermined procedure;
if the sender does not appear in the first list: process the message according to a second predetermined procedure.

The invention also provides a method for processing incoming messages in a handportable cellular telephone, comprising:

identifying a sender of an incoming message upon receipt of the message;
looking up the sender in a first user-defined list of potential senders of messages, and:
if the sender appears in the first list: processing the message according to a first predetermined procedure;
if the sender does not appear in the first list: processing the message according to a second predetermined procedure.

In the present context, the term "handportable cellular telephone" should be understood to comprise a hand-held, portable radio telephone which may, at least intermittently, be powered by one or more batteries or battery cells, including any mass-produced GSM- or UMTS-based mobile telephone. The phone preferably comprises a memory which may include an insertable chip card, such as a SIM card, or a memory module which is permanently integrated in the telephone. In addition to the memory of the telephone, a telecommunications network provider may designate a certain amount of memory in a data processing centre to a particular telephone or telephone number. For example, the contents of incoming messages may be stored in such a data processing centre, whereas the memory of the telephone may be adapted to store only identifiers and/or sender's information associated with incoming messages.

The potential senders comprised in the first list may preferably be identified by their telephone numbers, the telephone number of a sender of a message being usually transmitted by the telecommunications network provider along with the message itself. The list may also include an entry indicating to the processor of the telephone that messages sent from unlisted or non-disclosed numbers should be processed according to the first predetermined procedure.

A message may comprise an SMS message, an MMS message (Multimedia Messaging System), an alarm or reminder message and/or a message containing a ringing tone, one or more network settings for the telephone, an entry for a calendar system of the telephone, or any other message which is not a call which, when appropriately responded to by the user or a voice mail or voice message system, establishes a communication line between the caller and the user or between the caller and voice mail or message system. A message may for example also comprise an e-mail message which may contain file attachments. A typical size of a message is 1 kilobyte or less. However, it should be understood that also larger messages fall within the term message, such as messages of a size in the range of 1 kilobyte to 1 megabyte or even larger messages, the size being limited only by the capacity of the telephone and the telecommunications network in which the telephone is operated.

In a preferred embodiment of the invention, the first predetermined procedure makes the message available to a user of the telephone, whereas the second predetermined procedure discards the message without having made it available to a user of the telephone. In other words, the first list may be considered a white list or a trust list. Thus, any message originating from a sender whose identity does not appear in the first list may be discarded. Alternatively, the first list may be a so-called black list in which identities of senders are stored, messages from whom should be discarded, whereas messages from non-black-listed senders should be made available to the user. In both aforementioned embodiments, the processor may be configured to indicate to the user, via a user interface, that an incoming message has been discarded. There may for example also be provided a counter which counts the number of incoming discarded messages. If the identity of a sender of a discarded message has been provided along with the message, such an identity may be made available to the user.

As it will be understood from the above description, the user-defined list of potential senders may constitute a white list or a black list, a white list being a list of approved or accepted senders of messages, messages from who should be led through to the intended recipient, and a black list being a list of senders, messages from whom should be discarded without being led through to the intended recipient.

It will be appreciated that the provision of a user-defined list identifying potential senders, from whom messages are to be accepted or to be discarded, allows for improved flexibility and efficiency in setting up spam filters in a handportable cellular telephone. In particular, as the user of the telephone or another administrator thereof, such as a parent of a child, is not dependent from the provision of a white or black list provided and maintained by a telecommunications network provider, as in the prior art, the user or administrator may easily define new entries in the first list or remove entries from the list. Moreover, the user or administrator may choose to let messages from selected spam data sources, which have previously been regarded as spam data sources, through to the telephone, if messages from such selected spam data sources are of particular interest to the user of the telephone. Preferred embodiments accordingly allow for setting-up and maintenance of user-administrated spam filters. In the present context, the term spam message covers any unsolicited commercial message.

Multiple first lists may be provided. For example, one such list may store identities of potential senders of a first type of messages, whereas another such list may store identities of potential senders of another type of messages. Further first lists and types of messages may be provided. Thus, one filter may exist for text messages, whereas another filter may exist for alarm or reminder messages, and yet another filter may exist for messages containing pictures.

In the case of the first list being a white list, entries in that list may be derived from a phone directory stored in the memory of the phone. For example, the processor of the telephone may be configured to automatically, i.e. without user interference, store any entry in the phone directory in the first list. In one embodiment, the first list is constituted by the phone directory itself. In other embodiments, wherein two separate lists are stored, i.e. one phone directory list and one first list, the processor may be configured to prompt for user confirmation that an entry, deletion or change performed in the phone directory list should be mirrored in the first list. Also, a new entry, deletion or change in the first list may be automatically mirrored in the first list, or user confirmation of such mirroring may be required.

The method of the invention may further comprise emitting, after a predetermined delay time, a notification signal, for example a signal tone, a vibration signal or an optical notification in a display of the telephone, when a message has arrived. For example, the message may comprise a reminder or alarm signal which the sender may specify to activate after the predetermined delay or at a given hour and/or date. The reminder may be sent from one person desiring to initiate an alarm signal at an other person's cellular telephone at a given hour, for example from an adult desiring to remind a child that a given action should be performed at the time of the alarm signal. The delay time or the hour at which the notification signal should be emitted by the telephone may accordingly be comprised in or sent along with the message. The message may be sent to one single recipient, or it may be sent to a plurality of recipients at a time, for example to all children of a family. In one embodiment, a second user-defined list of potential senders may be stored, so that delayed notification of an incoming message as described above is performed only if the sender appears in the second list. For example, the second list may contain identifiers of particularly trusted potential senders, such as the parents of a child, the second list being, in one embodiment of the invention, a subset of the first list.

As an option, user accessibility for entering entries on the first and/or second list may be password protected. In those instances where the telephone is owned or administrated by a person different from the person carrying the phone, for example when the phone is administrated by an adult and carried by a child, access to the first and/or second list may be exclusively restricted to the adult. Embodiments, in which access to the first/second list is password protected, for example by a parent administrating the telephone of a child, confer the advantage that use of messages, such as SMS messages, by the child may be reduced if the child is not able to receive messages from persons other than those positively identified by the parent.

Once a message has arrived, a prompting signal indicating to the user that confirmation is required before the message will be stored may be emitted by the telephone. The prompting signal may comprise a signal tone, a vibration signal or an optical indication in a display of the telephone. User confirmation may be provided via a user interface of the telephone, for example via a keypad, a display touchpad, or a voice recognition system.

Further protection against spam messages may be provided by discarding messages which do not contain a code, such as a password or pin-code, for example a four-letter code in the heading portion of each message. The code may be entered by the sender of the message, or it may automatically be attached to the message once it is being sent from the sender's communication device. A plurality of codes may be provided, such that there is associated one code (or password) with each sender known to and accepted by the user of the telephone. A group of potential senders, such as the parents of a child using the telephone, may share one code.

It should be understood that, though the present claims relate to processing of incoming of messages in a telephone, the present invention also relates to a similar telephone and method for processing outgoing messages. Accordingly, the present invention also relates to, in an independent aspect, a telephone and a method for processing outgoing messages in a handportable cellular telephone, comprising:

storing a first user-defined list of potential recipients of messages;

identifying a recipient of an outgoing message;

looking up the recipient in the first list, and:

if the recipient appears in the first list: processing the message according to a first predetermined procedure;

if the sender does not appear in the first list: processing the message according to a second predetermined procedure.

Such a method is particularly useful in case access to the first list is restricted, for example by a password or pin-code. Thus, a parent administrating the telephone of a child may efficiently prevent excessive use of SMS messages (or other messages) by the child, e.g. by positively identifying accepted recipients of messages in a white list.

BRIEF DESCRIPTION OF THE DRAWINGS

Preferred embodiments of the invention will now be further described with reference to the drawings, in which.

DETAILED DESCRIPTION OF THE DRAWINGS

Figure 1:
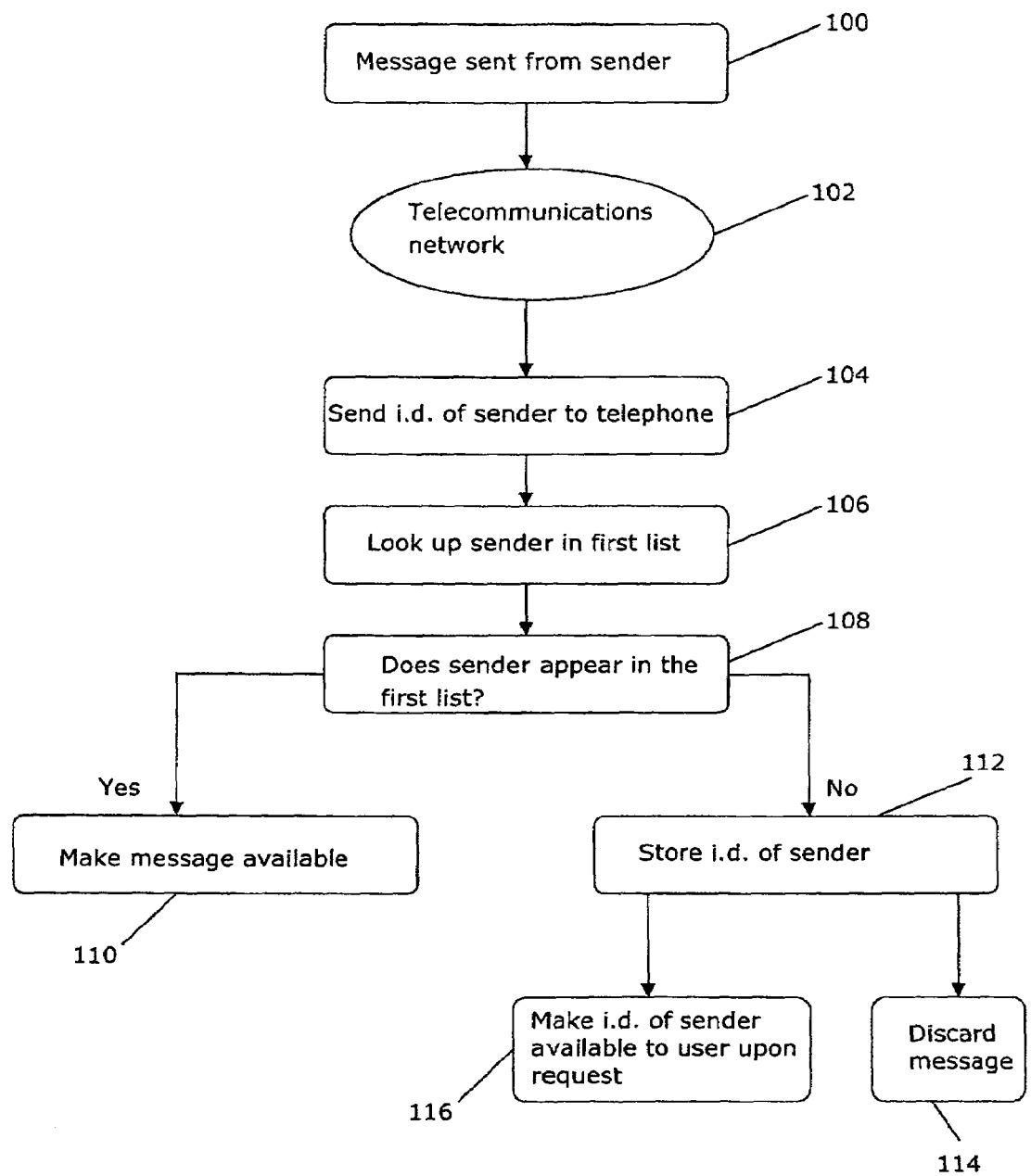
FIG. 1 illustrates a series of method step involving a first embodiment of the invention.

As illustrated in FIG. 1, a message, such as an SMS message or reminder message, is sent from a sender at step 100. The message is transmitted via a telecommunications network 102, the message including or being associated with an identification of a recipient of the message, the recipient carrying a handportable cellular telephone according to the invention.

The identification may for example be constituted by a telephone number of the recipient's telephone. At step 104, at least an identification of the sender of the message is provided to the recipient's telephone by the telecommunications network. In other embodiments of the invention, the entire message may be sent to the telephone at step 104. Once a notification of the message has arrived, a processor of the telephone initiates a comparison between entries in a first, previously stored list at steps 106 and 108. The list is preferably stored in a memory module of the telephone. However, the list may alternatively be stored at a remote facility, such as at a data processing centre of a telecommunications network provider, in which case the list may be retrieved by the telephone from the data processing centre at the request of the telephone. Alternatively, the list may be transmitted along with the identification of the sender at step 104 each and every time a notification of a new message is being transmitted to the telephone. In the embodiment of FIG. 1, the first list constitutes a white list which positively identifies senders, messages from whom should be led through to the recipient. Accordingly, if the identification of the sender is found in the first list, the message is made available to the recipient at step 110. Step 110 may comprise storing the message in a memory of the telephone, for example in a RAM or EEPROM module of the telephone. Alternatively, the message may be stored at a storage or memory means of a data processing centre of the telecommunications network provider. The processor of the telephone may further initiate that a notification signal is emitted to by the telephone, so as to notify the user of the message. In the case of the message comprising a text or e-mail message, it may be shown in a display of the telephone at the request of the user. Alternatively, if the message contains a delay notification, for example a predetermined delay time specified by the sender, the message is only made available to the user of the telephone once the delay time has elapsed. The predetermined delay time may be a specific hour on a specific day on which the message is to appear. Such delays are particularly useful in connection with alarms or reminders, the processing of which are further described below in connection with FIG. 2. A further example of processing of incoming messages is discussed in connection with FIG. 3.

As mentioned above, the first list is a white list in the embodiment shown. In another embodiment, the first list constitutes a black list which identifies potential senders, messages from whom should be discarded, in which case a positive answer at step 108 results in the message being discarded and a negative answer results in the message being made available at the telephone.

If the identification of the sender of the message is not found in the first list at step 108, the identification of the sender may be stored at step 112 and the message discarded at step 114. The identification of the sender, if available, may subsequently be retrieved by the user, so that the user may track senders of discarded messages. Thus, if an entry has been made in the first list by mistake, the availability of the identification of a sender of an accidentally erased message may prompt the user to remove that sender from the first list. A counter may count the number of incoming messages without making the respective identifications of the senders of discarded messages available to the user. It is a further alternative that the message is simply discarded without counting the number of incoming messages or storing identifications of senders, in which case steps 112 and 116 are not performed.

Figure 2:
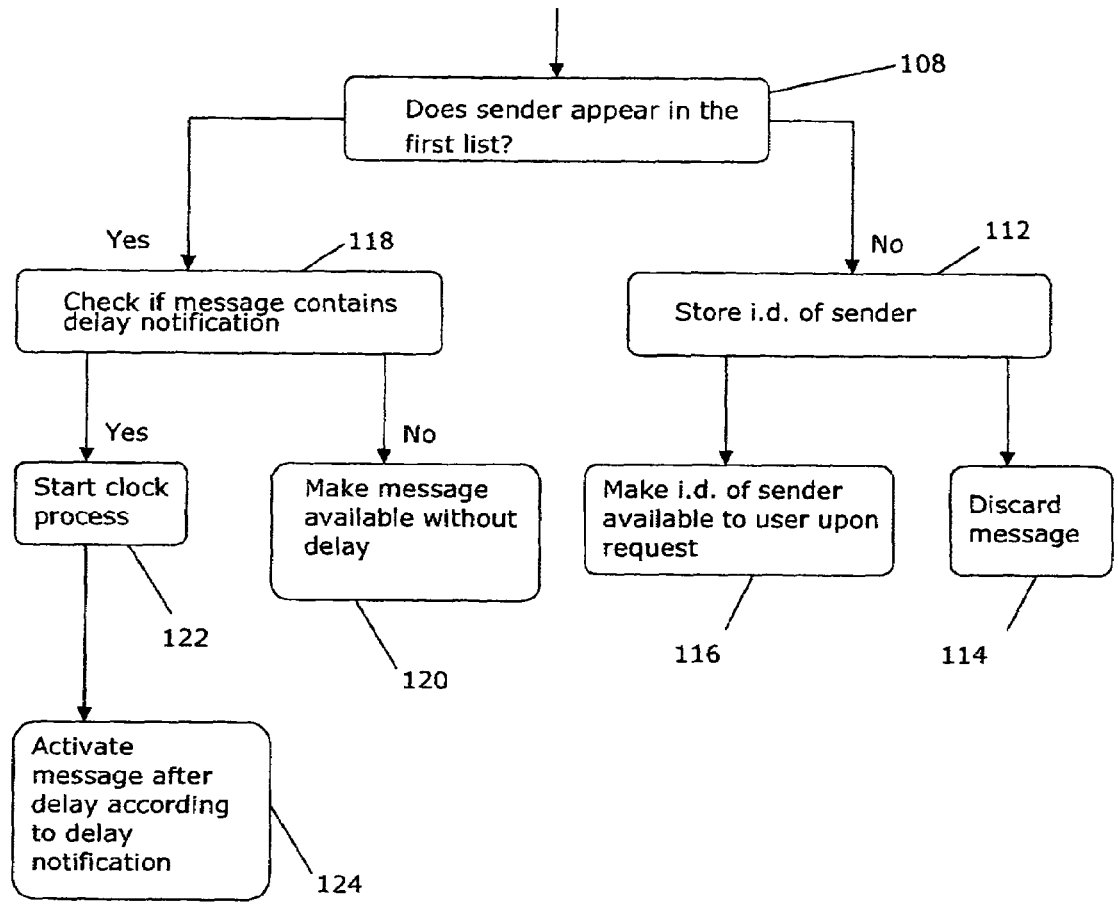
FIG. 2 illustrates a series of method steps involved in a part of a second embodiment of the invention.

The processing of incoming messages containing delay notifications is illustrated in FIG. 2, in which only procedures carried out subsequent to step 106 (see FIG. 1) are shown. In the embodiment of FIG. 2, steps 100-106 are performed as described above in connection with FIG. 1. Also, steps 112-116 are performed as described above. At step 118, a check is performed in order to establish whether or not the incoming message contains a delay notification in the form of a delay specified by the sender or in the form of a given time at which the sender wishes the message to be activated or to appear at the recipient's telephone. As discussed above, such a message may be an alarm or reminder signal, for example sent by a parent to a child. If no delay notification is comprised in the message, the message is made available without delay at step 120 in the same manner as the making available at step 110 discussed above in connection with FIG. 1. If a delay notification is present, a clock process is started at step 122 which eventually results in activation of the message at step 124 once the delay time specified in the message has elapsed. The activation at step 124 may simply comprise making the message available as described in connection with step 110 (cf. FIG. 1), or it may comprise emitting an acoustic, optical, vibrational and/or other alarm signal. The sender may for example specify that an alarm signal is to be emitted at a specific time on a specific day, or, alternatively, the sender may specify that the alarm signal is to be emitted in a given number of seconds, minutes, hours and/or days. In one embodiment, the sender may specify the kind of alarm signal to be emitted, so that the sender and not the recipient determines whether the alarm signal should comprise acoustic, optical, vibrational and/or other signals.

Figure 3:
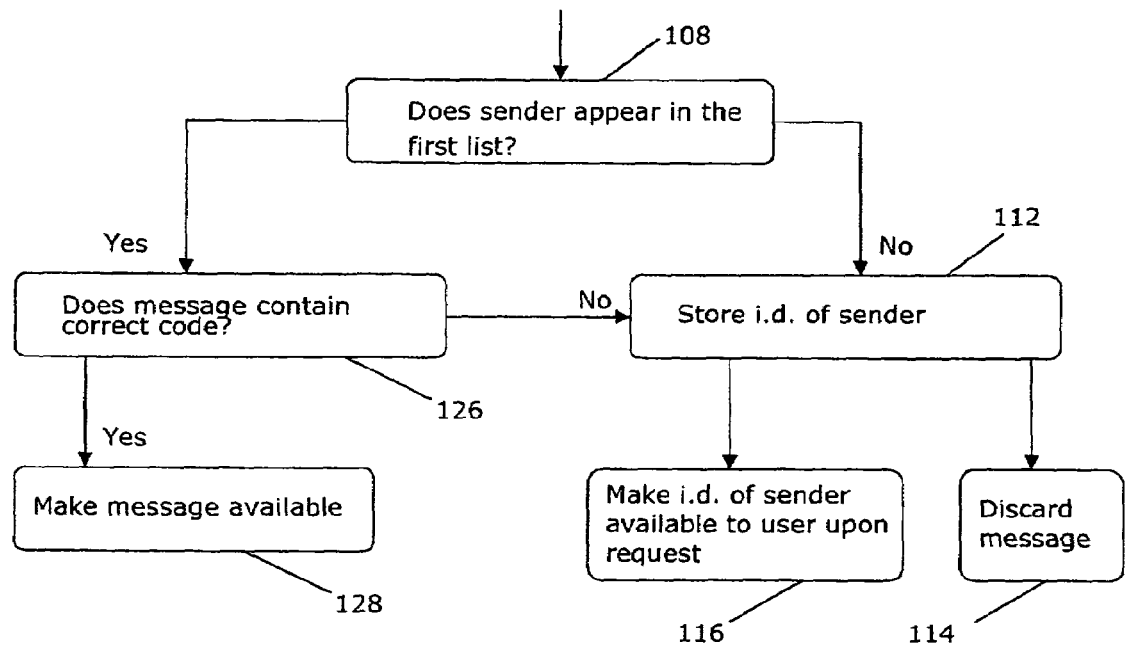
FIG. 3 illustrates a procedure for code checking of incoming messages.

Yet another procedure for processing incoming messages is shown in FIG. 3, steps 100-106 and 112-116 being also present in the embodiment of FIG. 3, cf. the description of FIG. 1. In the procedure of FIG. 3, an incoming message is only made available if it contains a correct code, for example a password or pin-code. If the identification of the sender of the message appears in the first list, it is checked at step 126 whether the message contains the correct code. The code may be defined by the user of administrator of the telephone receiving the message and may have previously been made available by the user or administrator to potential senders of messages. If the message does not contain the correct code, step 114 and optionally steps 112 and 116 are carried out. If the message does contain the correct code, the message is made available to the user of the telephone.

It should be understood that the procedures of processing incoming messages described with reference to FIGS. 2 and 3 may be seen as alternatives, but that embodiments of the present invention are feasible and within the scope of the claims, wherein steps 118-124 (FIG. 2) and steps 126-128 (FIG. 3) are combined. For example, steps 118, 122 and 124 (FIG. 2) may be performed subsequent to step 126 in FIG. 3 but prior to step 128, in which case step 124 essentially takes the place of step 128.

The invention claimed is:

1. A handportable cellular telephone adapted to receive incoming messages, and comprising a processor coupled to a memory and configured to:

store a first user-defined list comprising potential senders of messages and an entry for unidentified senders of messages;

upon receipt of an incoming non-call message, determine as appropriate to the non-call message an identity of a sender of the incoming non-call message or that the non-call message is from an unidentified sender;

for the case where the identity of the sender is determined, look up the sender in the first list, and:

if the sender appears in the first list: process the non-call message according to a first predetermined procedure;

if the sender does not appear in the first list; process the non-call message according to a second predetermined procedure; and for the case where it is determine that the sender is unidentified: process the non-call message according to the first predetermined procedure;

wherein said first user-defined list is derived from a directory stored on said handportable cellular phone and wherein said user-defined list is separate from said directory;

wherein the second predetermined procedure comprises discarding the message without having made it available to a user of the telephone and indicating to the user of the telephone that the message has been discarded;

and wherein the message is processed with reference to a spam filter that enables the user to allow messages from sources previously regard as spam data sources.

2. A telephone according to claim 1, wherein the processor is configured to cause the first predetermined procedure to make the message available to a user of the telephone.

3. A telephone according to claim 1, wherein the processor is configured to:

store a user-defined list of telephone numbers and associated identifiers of persons or entities, and include entries in the list of telephone numbers in said first list.

4. A telephone according to claim 1 and further comprising notifying means for emitting a notification signal, the processor being configured to cause the first predetermined procedure to cause the notifying means to emit the notification signal at a time specified by the sender as a given time or date or a predetermined delay, for indicating the presence of the incoming message.

5. A telephone according to claim 4, wherein the processor is configured to store a second user-defined list of potential senders, and cause the first predetermined procedure to:

store the incoming message immediately upon receipt thereof if the sender appears in the firs list; and only if the sender of the message also appears in the second list: cause the notifying means of the telephone to emit said notification signal.

6. A telephone according to claim 5, wherein the processor is configured to protect, by means of an access code, user accessibility for entering entries on first the second list.

7. A telephone according to claim 4 wherein the notification signal is specified by the sender and comprises one of an acoustic signal, and optical signal, and a vibration signal.

8. A telephone according to claim I and further comprising a user interface, the processor being configured to cause the user interface to emit a prompting signal indicating to the user that confirmation is required before the message will be stored, the user interface being adapted to receive the user confirmation, the processor being further configured to cause storing the message once the user confirmation has been provided to the processor via the user interface.

9. A telephone according to claim I, wherein the processor is configured to:

store at least one criterion to be fulfilled by a code contained in the incoming message;

derive the code from the incoming message;

perform a check to establish whether the code fulfills said criterion;

cause the first predetermined procedure to make the message available to the user if the code fulfils the criterion; and cause the first predetermined procedure to discard the message if the code does not fulfill the criterion.

10. A telephone according to claim 1, wherein the non-call message comprises one of a short message service SMS, multi-media message service MMS, an alarm message, and a reminder message.

11. A telephone according to claim 10 wherein the first list comprises a plurality of message-type lists, at least two of which are selected from the group text messages, alarm or reminder messages, and messages that include pictures, and the processor is configured to process the non-call message according to the first predetermined procedure if the sender appears in the message-type list for the type of the incoming non-call message.

12. A method for processing incoming messages in a handportable cellular telephone, comprising:

determining upon receipt of an incoming non-call message an identity of a sender of the message or that the message is from an unidentified sender as appropriate to the non-call message;

for the case where the identity of the sender is determined, looking up the sender in a first user-defined list comprising potential senders of messages and an entry for unidentified senders of messages, and: p2 if the sender appears in the first list: processing the non-call message according to a first predetermined procedure; p2 if the sender does not appear in the first list: processing the non-call message according to a second predetermined procedure; and for the case where it is determined that the sender is unidentified: processing the non-call message according to the first predetermined procedure;

wherein said first user-defined list is derived from a directory stored on said handportable cellular phone and wherein said user-defined list is separate from said directory;

wherein the second predetermined procedure comprises discarding the message without having made it available to a user of the telephone and indicating to the user that the message has been discarded;

and wherein the message is processed with reference to a spam filter that enable the user to allow messages from sources previously regarded as spam data sources.

13. A method according to claim 12, wherein the first predetermined procedure makes the message available to a user of the telephone.

14. A method according to claim 12, comprising, in the first list, entries in a user-defined list of telephone numbers and associated identifiers of persons or entities.

15. A method according to claim 12 and further comprising emitting a notification signal at a time specified by the sender as a given time or date or a predetermined delay, for indicating the presence of the incoming message.

16. A method according to claim 15 further comprising:

storing the incoming message immediately upon receipt thereof if the sender appears in the first list; and only if the sender of the message also appears in a second user-defined list of potential senders: cause the notifying means of the telephone to emit said notification signal.

17. A method according to claim 16 wherein the non call message comprises one of a short message service SMS, multi-media message service MMS, an alarm message, and a reminder message.

18. A method according to claim 15 wherein the notification signal is specified by the sender and comprises one of an acoustic signal, and optical signal, and a vibration signal.

19. A method according to claim 12, wherein the non-call message comprises one of a short message service SMS, multi-media message service MMS, an alarm message, and a reminder message.

20. A method according to claim 19 wherein the first list comprises a plurality of message-type lists, at least two of which are selected from the group text messages, alarm or reminder messages, and messages that include pictures, and the method comprises processing the non-call message according to the first predetermined procedure if the sender appears in the message-type list for the type of the incoming non-call message.

* * * * *

UNITED STATES PATENT AND TRADEMARK OFFICE
CERTIFICATE OF CORRECTION

PATENT NO. : 7,330,713 B2
APPLICATION NO. : 10/655457
DATED : February 12, 2008
INVENTOR(S) : Zhu It is certified that error appears in the above-identified patent and that said Letters Patent is hereby corrected as shown below:

In The Claims:

In Claim 1, Column 7, line 12, delete "determine" and replace with --determined--.

In Claim 5, Column 7, line 47, delete "firs" and replace with --first--.

In Claim 6, Column 7, line 53, delete "first".

In Claim 12, Column 8, line 32, delete "p2".

In Claim 12, Column 8, line 34, delete "p2".

Signed and Sealed this

Eighth Day of July, 2008

JON W. DUDAS
*Director of the United States Patent and Trademark Office*